United States Patent
Pettersson et al.

(10) Patent No.: US 10,499,614 B2
(45) Date of Patent: Dec. 10, 2019

(54) ANIMAL FORAGE HANDLING ARRANGEMENT AND METHOD OF CONTROLLING THE SAME

(71) Applicant: DELAVAL HOLDING AB, Tumba (SE)

(72) Inventors: Uno Pettersson, Tumba (SE); Erik Svensson, Tumba (SE)

(73) Assignee: DeLaval Holding AB, Tumba (SE)

( * ) Notice: Subject to any disclaimer, the term of this patent is extended or adjusted under 35 U.S.C. 154(b) by 617 days.

(21) Appl. No.: 15/128,445

(22) PCT Filed: Mar. 31, 2015

(86) PCT No.: PCT/SE2015/050398
§ 371 (c)(1),
(2) Date: Sep. 23, 2016

(87) PCT Pub. No.: WO2015/152810
PCT Pub. Date: Oct. 8, 2015

(65) Prior Publication Data
US 2017/0105387 A1 Apr. 20, 2017

(30) Foreign Application Priority Data
Apr. 3, 2014 (SE) ...................... 1450398

(51) Int. Cl.
*A01K 5/02* (2006.01)
*A01K 5/00* (2006.01)
*A01K 5/01* (2006.01)

(52) U.S. Cl.
CPC ............ *A01K 5/0208* (2013.01); *A01K 5/005* (2013.01); *A01K 5/01* (2013.01); *A01K 5/0291* (2013.01)

(58) Field of Classification Search
CPC .......... A01K 1/105; A01K 1/10; A01K 5/001; A01K 5/0208
(Continued)

(56) References Cited

U.S. PATENT DOCUMENTS 3,759,227 A * 9/1973 Wolfe .................. A01K 5/0208
119/57.7
4,154,376 A * 5/1979 Jones ................... A01K 5/0208
119/57.7
(Continued)

FOREIGN PATENT DOCUMENTS

EP 1 625 787 A2 2/2006
EP 1 723 846 A1 11/2006
(Continued)

OTHER PUBLICATIONS

International-Type Search Report, dated Oct. 6, 2014, from corresponding PCT application.
(Continued)

*Primary Examiner* — Yvonne R Abbott-Lewis
(74) *Attorney, Agent, or Firm* — Young & Thompson (57) ABSTRACT

A method of controlling an animal forage handling arrangement that includes a first forage dispensing arrangement having a first conveyor, a first separator adapted to separate and distribute forage, and a first dispensing end portion and a first loading end portion. The arrangement further includes a control unit, the control unit adapted to control a driving of the first conveyor and includes a first forage presence sensor arranged at the first loading end portion. The method includes starting the first conveyor to move an upper side of the first conveyor towards the first loading end portion, and, to prepare the first conveyor to be loaded with forage, stopping the first conveyor when a loading condition is fulfilled.

19 Claims, 2 Drawing Sheets

(58) Field of Classification Search
USPC .............................. 119/57.1, 60, 51.11, 57.7
See application file for complete search history.

(56) References Cited

U.S. PATENT DOCUMENTS

| | | | | |
|---|---|---|---|---|
| 6,039,002 | A * | 3/2000 | Strankman | A01K 1/105 119/57.1 |
| 6,273,024 | B1 * | 8/2001 | Windholz | A01K 1/10 119/60 |
| 6,481,373 | B2 * | 11/2002 | Swetzig | A01K 5/001 119/51.11 |
| 8,827,542 | B2 * | 9/2014 | Bachman | A01K 5/00 366/141 |

FOREIGN PATENT DOCUMENTS

| | | |
|---|---|---|
| FR | 2 874 792 A1 | 3/2006 |
| GB | 2496941 A | 5/2013 |
| SU | 121021 A1 | 6/1958 |
| SU | 818569 A1 | 4/1981 |
| SU | 888882 A1 | 12/1981 |
| SU | 1248573 A1 | 8/1986 |
| SU | 1428320 A1 | 10/1988 |
| WO | 2009/045158 A1 | 4/2009 |
| WO | 2014/021716 A1 | 2/2014 |

OTHER PUBLICATIONS

International Search Report, dated Jun. 25, 2015, from corresponding PCT application.
Supplementary International Search Report, dated Aug. 5, 2016, from corresponding PCT application.

* cited by examiner

ANIMAL FORAGE HANDLING ARRANGEMENT AND METHOD OF CONTROLLING THE SAME

TECHNICAL FIELD

The present invention relates to a method of controlling an animal forage handling arrangement, wherein the animal forage handling arrangement comprises a first forage dispensing arrangement adapted to separate and distribute forage. The present invention further relates to an animal forage handling arrangement adapted to perform the method.

BACKGROUND

EP 1625787 discloses an apparatus for separating and mixing feed for livestock comprising at least two units for processing feed. Each unit is provided with a space for receiving one or more bales of feed and reducing means for separating feed from a bale. The apparatus furthermore comprises a mixing container comprising a space for mixing feed components into a feed mixture, conveying means for supplying separated feed to the mixing container, and delivery means for delivering the feed mixture from the mixing space. Each reducing means is arranged for separating and discharging feed from one side of a bale of feed, and the mixing space forms part of a mixing container configured with a driveable mixing element. Weighing means are provided for weighing the amount of feed that has been supplied to the mixing container. A programmable control unit is provided, which control unit comprises input means for inputting a desired amount and composition of the feed mixture and which is capable of controlling each reducing means independently for separating an amount of feed from a bale of feed in dependence on the desired amount and composition of the feed mixture and the amount of feed as weighed by the weighing means that has been supplied to the mixing container.

Each unit disclosed in EP 1625787 may be referred to as a buffer table. On a buffer table forage is placed for separation and further distribution. Commonly the separated forage is distributed to a mixing device for mixing with other feed ingredients to form a specific feed suitable for a certain kind of animal. The buffer table comprises a conveyor for transporting forage from a loading end portion of the buffer table towards a dispensing end portion of the buffer table where the forage is separated and distributed, e.g. by a shredder comprising one or more rotors, or by some other kind of cutting or riving device.

If previously loaded forage remains on the conveyor when replenishing a buffer table with forage, a gap will form between the forage previously placed on the buffer table and the newly loaded forage due to the length of the conveyor. The gap will complicate metered dispensing of forage from the buffer table. Thus, the conveyor is reversed by the farmer until the forage previously placed on the buffer table is close enough to the loading end portion to avoid a gap on the conveyor when replenishing the buffer table.

SUMMARY

It is an object of the present invention to facilitate and to provide a time efficient replenishing of forage onto an animal forage handling arrangement.

According to an aspect of the invention, the object is achieved by a method of controlling an animal forage handling arrangement. The animal forage handling arrangement comprises a first forage dispensing arrangement comprising a first container, a first conveyor, and a first separator adapted to separate and distribute forage. The first container comprises two opposed lateral side surfaces, and a first dispensing end portion and a first loading end portion arranged between the two opposed lateral side surfaces. The first separator is arranged at the first dispensing end portion of the first container, and the first conveyor is arranged at a bottom of the first container. The animal forage handling arrangement further comprises a control unit, the control unit being adapted to control a driving of the first conveyor and comprises a first forage presence sensor arranged at the first loading end portion. The method comprises:

starting the first conveyor to move an upper side of the first conveyor towards the first loading end portion, and stopping the first conveyor when a loading condition is fulfilled, to prepare the first conveyor to be loaded with forage.

Since the first conveyor is stopped when a loading condition is fulfilled, a farmer starting a reversing of the first conveyor, i.e. moving the upper side of the first conveyor towards the loading end portion, may tend to other matters during the reversing of the first conveyor, such as fetching forage to load the first conveyor with. As a result, the above mentioned object is achieved.

The first forage dispensing arrangement may form a buffer table. The animal forage handling arrangement may comprise one or more forage dispensing arrangements. The animal forage handling arrangement may form part of an animal feed preparing arrangement, which may include a mixing device for mixing various feed components including forage from the first forage dispensing arrangement, and one or more further forage dispensing arrangements, and/or other devices. In the mixing device different kinds of forage and other feed components may be mixed prior to being apportioned to animals.

Forage in the form of bales, blocks or in other forms on the first conveyor may be transported thereby towards the first separator adapted to separate and distribute forage. The forage may be compact forage such as various kinds of silage or beet pulp. The first forage dispensing arrangement may be used also for distributing less compact forage, such as e.g. straw.

The purpose of the first separator is to work loose compact forage and to share out the forage on the first conveyor at a suitable rate for further processing and/or distribution of the forage. The first separator separates a partial amount of the forage from the forage on the first conveyor. The term "separate and distribute forage" is to be interpreted in a broad sense, which includes inter alia riving, shredding, cutting, and feeding out forage from the first conveyor. Separated forage is easier to handle for other feeding equipment on a farm than compact forage. The separated forage is for instance easier to dispense and to portion out accurately onto a feeding table, from which animals feed. The separated forage is also easier to eat for animals than compact forage. The first separator may comprise at least one elongated rotor, e.g. an auger, it may be provided with protruding blades. The first separator may alternatively comprise any other cutting or shredding device able to separate and distribute forage.

The control unit may be an electronic control unit connected to a driving motor of the first conveyor. The control unit may be adapted to control one or more driving motors of conveyors of one or more further animal forage dispensing arrangements. The control unit may be programmable.

The control unit may comprise a remote control unit. The control unit may be adapted to perform the method of aspects and/or embodiments herein.

According to embodiments, the loading condition may be a first loading condition, which first loading condition may be fulfilled when the first forage presence sensor detects a presence of forage. Since the first forage presence sensor is arranged at the first loading end portion, the first conveyor is stopped when the first conveyor has been reversed to a position where any remaining forage on the first conveyor is located at the first loading end portion at the first forage presence sensor. A farmer thus, may load forage onto the first conveyor in abutment with the remaining forage on the first conveyor. The exact position of the first forage presence sensor at the first loading end portion may be adapted to the portion size of silage on the relevant farm and the relevant loading equipment used to provide a suitable space for loading forage onto the first conveyor in abutment with any remaining forage on the first conveyor.

According to embodiments, the control unit may comprise a timer and the loading condition may be a second loading condition, which second loading condition is fulfilled when the timer reaches an end of a first time period, and wherein the method comprises:
starting the timer to count the first time period when starting the first conveyor to move the upper side of the first conveyor towards the first loading end portion. In this manner it may be ensured that reversing of the first conveyor is stopped in case the first conveyor should have been reversed without any significant amount of forage on the first conveyor, i.e. not enough forage to be detected by the first forage presence sensor. Suitably, the first time period may have a length corresponding to the first conveyor traveling approximately one full length of the first container, i.e. the time period length corresponds to a portion of an upper side of the first conveyor traveling from the dispensing end portion to the loading end portion.

The first and second loading conditions may both be applicable to the first forage dispensing arrangement in different situations, depending on the amount of forage on the first conveyor. If forage remains on the first conveyor when loading of the first conveyor is initiated, the first loading condition applies. If no forage remains on the first conveyor and personnel starts to move the upper side of the first conveyor towards the first loading end portion, the second loading condition applies. Thus, the second loading condition forms more of a protective safety measure since the first conveyor would be ready for loading without reversing the first conveyor.

According to embodiments, the method may comprise:
loading a portion of forage onto the first conveyor at the first loading end portion, starting the first conveyor to move the upper side of the first conveyor towards the first dispensing end portion, and
stopping the first conveyor when an advancing condition is fulfilled. In this manner an automatic advancing of the first conveyor may be achieved, i.e. an automatic moving of the upper side of the first conveyor towards the first dispensing end portion, and personnel in the process of loading the first conveyor with forage need not tend to the advancing of the first conveyor prior to loading a subsequent portion of forage onto the first conveyor.

According to embodiments, the advancing condition may be a first advancing condition, which first advancing condition may be fulfilled when the first forage presence sensor detects an absence of forage. Due to the position of the first forage presence sensor at the first loading end portion it may be ensured that the first conveyor has been advanced to a position making room for loading a subsequent portion of forage onto the first conveyor.

According to embodiments, the control unit may comprise a timer and the advancing condition may be a second advancing condition, which second advancing condition may be fulfilled when the timer reaches an end of a second time period. The method may comprise:
starting the timer to count the second time period when starting the first conveyor to move the upper side of the first conveyor towards the first dispensing end portion. This may provide an alternative to the first advancing condition. Suitably, the second time period may have a length corresponding to the time it takes for the first conveyor to travel a distance corresponding to the size of one portion of forage to be loaded on the first conveyor. The actual length of the second time period to provide a suitable space for loading forage onto the first conveyor in abutment with any remaining forage on the first conveyor may depend on the portion size of silage on the relevant farm and the relevant loading equipment used.

According to embodiments, the control unit may comprise a second forage presence sensor arranged at the first dispensing end portion. In this manner further control of the traveling of the first conveyor may be achieved.

According to embodiments, the advancing condition may be a third advancing condition, which third advancing condition may be fulfilled when the second forage presence sensor detects a presence of forage. In this manner the first conveyor may be automatically stopped when the first conveyor has been loaded with forage to such an extent that the forage reaches the dispensing end portion at the second forage presence sensor.

According to embodiments, the control unit may be connected to a first notification device, and the method may comprise:
keeping track of a progress of the movement of the upper side of the first conveyor towards the first dispensing end portion, and
indicating by means of the first notification device a progress of a portion of the first conveyor along a distance between the first loading end portion and the first dispensing end portion. In this manner a farmer may be made aware of when it may be time to replenish the first forage dispensing arrangement with forage.

According to alternative embodiments, the control unit may be connected to a first notification device, and the method may comprise:
activating the first notification device when the second forage presence sensor detects an absence of forage. In this manner a farmer may be made aware of when it may be time to replenish the first forage dispensing arrangement with forage.

According to embodiments, the animal forage handling arrangement may comprise a second forage dispensing arrangement comprising a second container, a second conveyor, and a second separator adapted to separate and distribute forage. The second container may comprise two opposed lateral side surfaces, and a second dispensing end portion and a second loading end portion arranged between the two opposed lateral side surfaces. The second separator may be arranged at the second dispensing end portion of the second container. The second conveyor may be arranged at a bottom of the second container, wherein the control unit may be adapted to control a driving of the second conveyor and may comprise a third forage presence sensor arranged at the second loading end portion. The method may comprise:

starting the second conveyor to move an upper side of the second conveyor towards the second loading end portion if the first conveyor is standing still. In this manner the control unit may be utilised to drive the second conveyor when the first conveyor is standing still. This may be done e.g. during a process of loading the first animal forage dispensing arrangement to prepare the second animal dispensing arrangement for a subsequent loading with forage.

According to embodiments, the method may comprise:

stopping the second conveyor when the first conveyor is started. In this manner the control unit may prioritize a movement of the first conveyor.

According to embodiments, the method may comprise:

prioritising a movement of the first conveyor over a movement of the second conveyor if the first forage dispensing arrangement is in a process of being loaded with forage, and prioritising a movement of the second conveyor over a movement of the first conveyor if the second forage dispensing arrangement is in a process of being loaded with forage. In this manner a loading of the first and second conveyors, respectively, may be finished before the other conveyor is being loaded, without being delayed by the moving of the other conveyor.

According to embodiments, the first notification device may be related to the first forage dispensing arrangement and the control unit may be connected to a second notification device related to the second forage dispensing arrangement. The method may comprise:

activating the first notification device in a first notification mode if the first forage dispensing arrangement is in a process of being loaded with forage, and activating the second notification device in the first notification mode if the second forage dispensing arrangement is in a process of being loaded with forage. In this manner personnel may be notified of which of the first and second forage dispensing arrangements is in the process of being loaded.

According to embodiments, the method may comprise:

activating the first notification device in a second notification mode if the second forage dispensing arrangement is in a process of being loaded and the first forage dispensing arrangement is set to be loaded after the second forage dispensing arrangement, and activating the second notification device in the second notification mode if the first forage dispensing arrangement is in a process of being loaded and the second forage dispensing arrangement is set to be loaded after the first forage dispensing arrangement. In this manner personnel may be notified of the first or second forage dispensing arrangement being set to be loaded after finishing loading the other of the first or second forage dispensing arrangement.

According to a further aspect of the invention there is provided an animal forage handling arrangement adapted to perform a method according to any one of aspect and/or embodiment disclosed herein.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
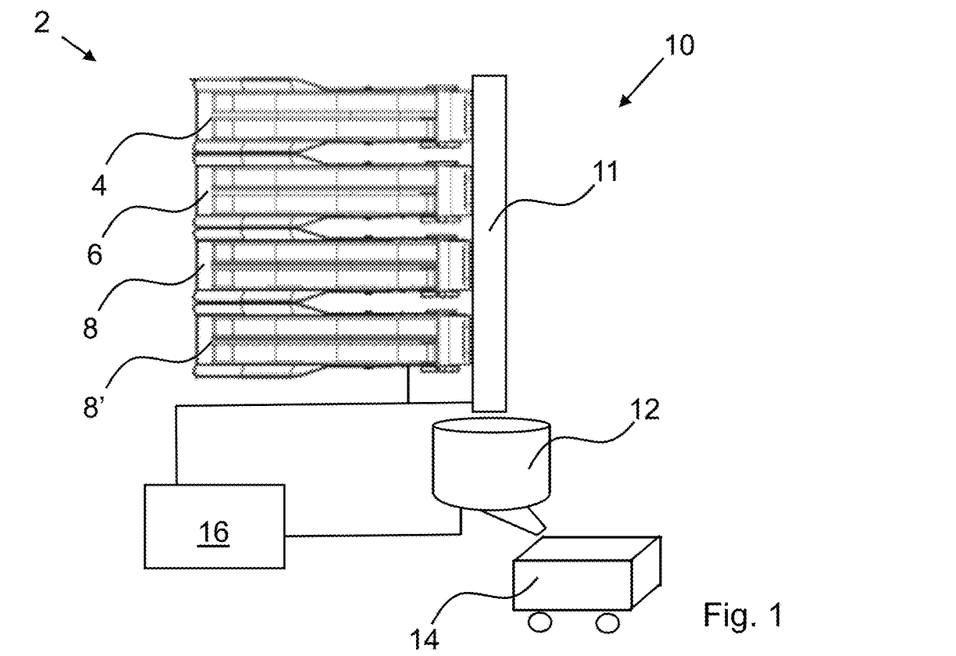
FIG. 1 illustrates schematically an animal forage handling arrangement according to embodiments.

FIG. 1 illustrates schematically an animal forage handling arrangement 2 according to embodiments. The animal forage handling arrangement 2 is adapted to perform a method according to any one of aspect and/or embodiment disclosed herein.

The animal forage handling arrangement 2 comprises a first forage dispensing arrangement 4, a second forage dispensing arrangement 6, and two further forage dispensing arrangements 8, 8'. The animal forage handling arrangement 2 forms part of an animal feed preparing arrangement 10. The animal feed preparing arrangement 10 according to these embodiments comprises a transport belt 11 adapted to transport forage from the first, second, and further forage dispensing arrangements 4, 6, 8, 8' to a mixing device 12 for mixing various feed components including forage from the first, second, and further forage dispensing arrangements 4, 6, 8, 8'. In the mixing device 12 the forage may be weighed and mixed. From the mixing device 12 the mixed feed is transferred to a feeding wagon 14, from which the feed is being apportioned to animals. In alternative embodiments the mixing of feed components may be performed in a feeding wagon comprising a feed mixing member. (In FIG. 1 the first, second, and further forage dispensing arrangements 4, 6, 8, 8' and the transport belt 11 are shown in a top view and the mixing device 12 and the feeding wagon 14 in a side view.)

The animal forage handling arrangement 2 comprises a control unit 16 adapted to control drive members, such as e.g. electric motors, of the first, second, and further forage dispensing arrangements 4, 6, 8, 8'. The control unit 16 may further be adapted to control separators of the first, second, and further forage dispensing arrangements 4, 6, 8, 8'. The control unit 16 may further be adapted to control also other components of the animal feed preparing arrangement 10, such as the transport belt 11 and the mixing device 12

Figure 2:
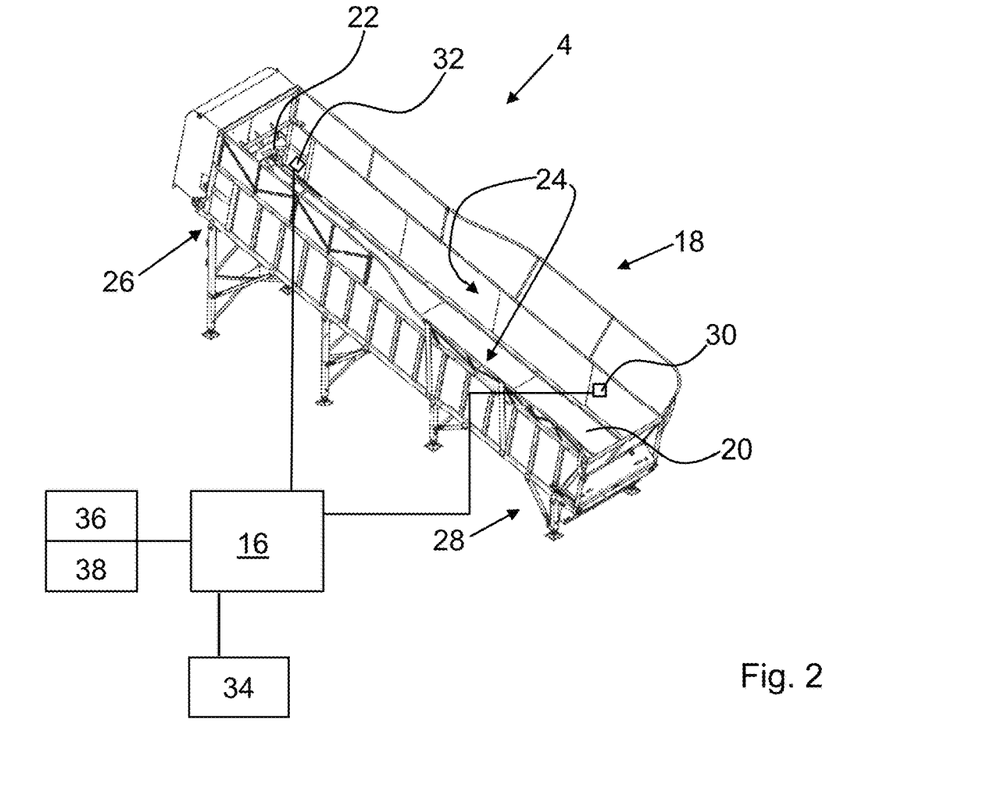
FIG. 2 illustrates an animal forage dispensing arrangement according to embodiments.

FIG. 2 illustrates an animal forage dispensing arrangement according to embodiments. The first, second, and further forage dispensing arrangements 4, 6, 8, 8' illustrated in FIG. 1 may be of the kind illustrated in FIG. 2. In the following discussion of FIG. 2, reference will be made to various "first" features of the first forage dispensing arrangements 4. Corresponding features form part of a second forage dispensing arrangement 6 discussed at other places herein, and are in connection therewith referred to as "second".

The first animal forage dispensing arrangement 4 comprises a first container 18, a first conveyor 20, and a first separator 22 adapted to separate and distribute forage. The first container 18 comprises two opposed lateral side surfaces 24, and a first dispensing end portion 26 and a first loading end portion 28 arranged between the two opposed lateral side surfaces 24. The first separator 22 is arranged at the first dispensing end portion 26. The first conveyor 20 is arranged at a bottom of the first container 18.

The opposed lateral side surfaces 24 may be formed by sidewalls of the first container 18. The side surfaces 24 keep forage on the conveyor 20. The sidewalls may have a height of e.g. 1-2 metres, suitably chosen for the size of forage to be placed on the first conveyor 20. The first conveyor 20 is adapted to transport forage stored in the first container 18 towards the first dispensing end portion 26. That is, the first conveyor 20 is arranged to transport forage from the first loading end portion 28 to the first dispensing end portion 26. Moreover, the first conveyor 20 may be arranged to transport forage from the first dispensing end portion 26 to the first loading end portion 28. The latter may be the case when the first animal forage dispensing arrangement 4 is to be replenished with forage. In these embodiments the first separator 22 comprises an elongated rotor adapted to separate and distributes forage for further handling and distribution to animals.

The first conveyor 20 is driven by a non-shown electric motor. The control unit 16 of the animal forage handling arrangement 2 is adapted to control a driving of the first conveyor 20 by controlling the motor of the first conveyor 20. Optionally, the control unit 16 may also control a motor of the elongated rotor. As mentioned above in connection with FIG. 1, the control unit 16 may be adapted to control the conveyors and/or elongated rotors of further animal forage dispensing arrangements. By means of the control unit 16 the first conveyor 20 may be started in an advancing direction, i.e. wherein an upper side of the first conveyor 20 is moved towards the first dispensing end portion 26, in a reversing direction, i.e. wherein the upper side of the first conveyor 20 is moved towards the first loading end portion 28, and stopped. The control unit 16 may comprise a remote control. Thus, the farmer may easily control the first animal forage dispensing arrangement 4 and further forage dispensing arrangements of the animal forage handling arrangement 2 via the remote control while replenishing the animal forage dispensing arrangements with forage.

The control unit 16 comprises a first forage presence sensor 30 arranged at the first loading end portion 28 and may comprise a second forage presence sensor 32 arranged at the first dispensing end portion 26. (Herein, when a second animal forage dispensing arrangement 6 is discussed, the first forage presence sensor 30 of the first forage dispensing arrangement 4 corresponds to a third forage presence sensor arranged at the loading end portion of the second animal forage dispensing arrangement 6.)

The control unit 16 may comprise a timer 34. The control unit 16 may be connected to a first notification device 36. The control unit 16 may be connected to a second notification device 38. The first and second notification devices 36, 38 may comprise one or more lamps, which may be lit in different ways/modes, such as constant or flashing light, to provide different kind of information related to the animal forage handling arrangement. The first and second notification devices 36, 38 may comprise one or more screens for displaying information related to the animal forage handling arrangement.

Figure 3:
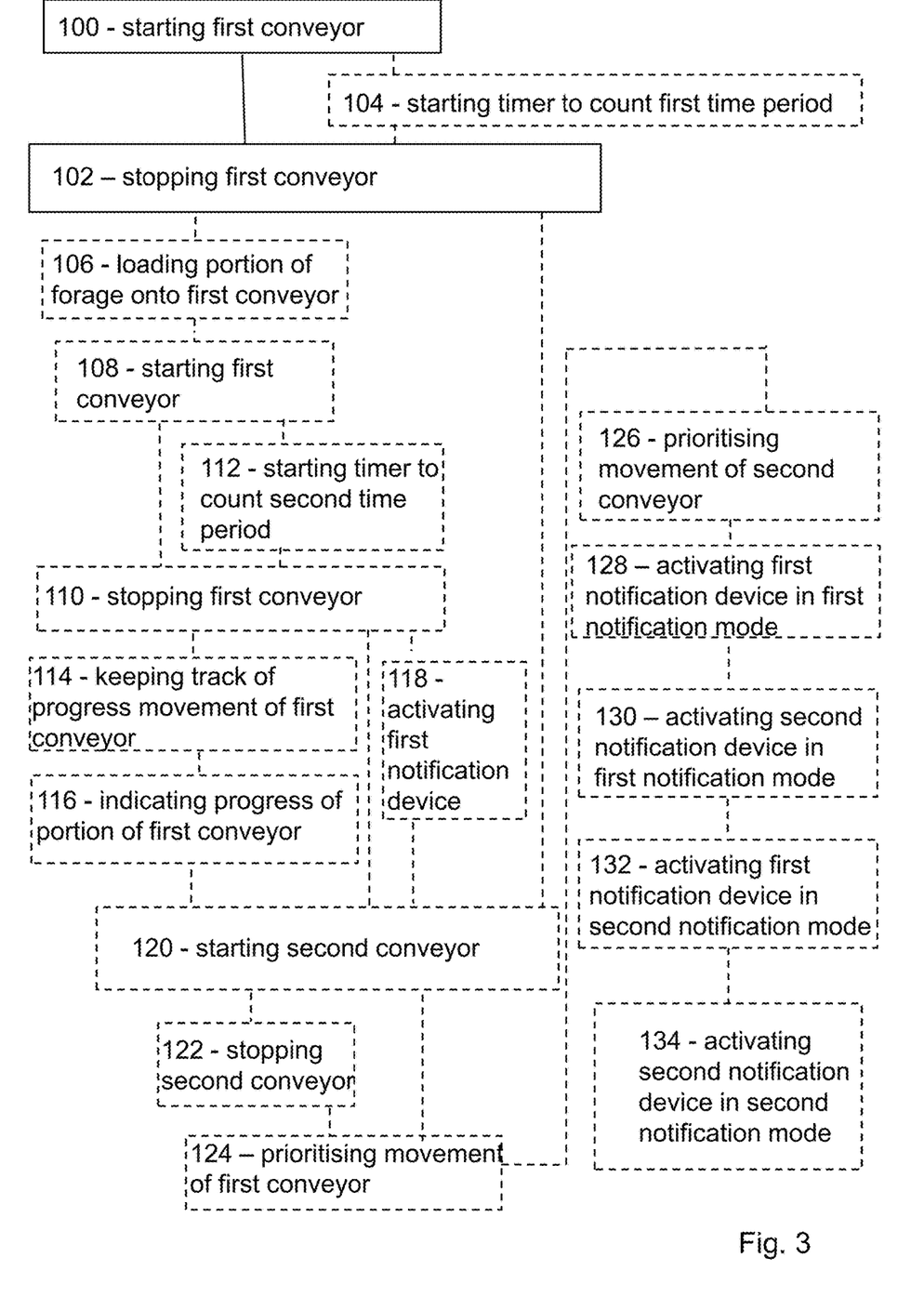
FIG. 3 illustrates a method of controlling an animal forage handling arrangement according to embodiments.

FIG. 3 illustrates a method of controlling an animal forage handling arrangement according to embodiments. The animal forage handling arrangement may be an animal forage handling arrangement 2 as discussed in connection with FIG. 1 and may comprise one or more forage dispensing arrangements 4, 6 as discussed in connection with FIGS. 1 and 2.

The method comprises:
starting 100 the first conveyor to move an upper side of the first conveyor towards the first loading end portion, and
stopping 102 the first conveyor when a loading condition is fulfilled, to prepare the first conveyor to be loaded with forage.

According to embodiments, the loading condition may be a first loading condition, which first loading condition may be fulfilled when the first forage presence sensor detects a presence of forage.

According to embodiments, the loading condition may be a second loading condition, which second loading condition is fulfilled when the timer reaches an end of a first time period, and wherein the method comprises:
starting 104 the timer to count the first time period when starting the first conveyor to move the upper side of the first conveyor towards the first loading end portion.

According to embodiments, the method may comprise:
loading 106 a portion of forage onto the first conveyor at the first loading end portion,
starting 108 the first conveyor to move the upper side of the first conveyor towards the first dispensing end portion, and
stopping 110 the first conveyor when an advancing condition is fulfilled.

According to embodiments, the advancing condition may be a first advancing condition, which first advancing condition may be fulfilled when the first forage presence sensor detects an absence of forage.

According to embodiments, the advancing condition may be a second advancing condition, which second advancing condition may be fulfilled when the timer reaches an end of a second time period. The method may comprise:
starting 112 the timer to count the second time period when starting the first conveyor to move the upper side of the first conveyor towards the first dispensing end portion.

According to embodiments, the advancing condition may be a third advancing condition, which third advancing condition may be fulfilled when the second forage presence sensor detects a presence of forage.

According to embodiments, the method may comprise:
keeping 114 track of a progress of the movement of the upper side of the first conveyor towards the first dispensing end portion, and
indicating 116 by means of the first notification device a progress of a portion of the first conveyor along a distance between the first loading end portion and the first dispensing end portion.

According to embodiments, the method may comprise:
activating 118 the first notification device when the second forage presence sensor detects an absence of forage.

According to embodiments, the animal forage handling arrangement may comprise a second forage dispensing arrangement comprising a third forage presence sensor arranged at the second loading end portion. The method may comprise:
starting 120 the second conveyor of the second animal forage dispensing arrangement to move an upper side of the second conveyor towards the second loading end portion if the first conveyor is standing still.

According to embodiments, the method may comprise:
stopping 122 the second conveyor when the first conveyor is started.

According to embodiments, the method may comprise:
prioritising 124 a movement of the first conveyor over a movement of the second conveyor if the first forage dispensing arrangement is in a process of being loaded with forage, and prioritising 126 a movement of the second conveyor over a movement of the first conveyor if the second forage dispensing arrangement is in a process of being loaded with forage.

According to embodiments, the first notification device may be related to the first forage dispensing arrangement and the second notification device may be related to the second forage dispensing arrangement. The method may comprise:
activating 128 the first notification device in a first notification mode if the first forage dispensing arrangement is in a process of being loaded with forage, and
activating 130 the second notification device in the first notification mode if the second forage dispensing arrangement is in a process of being loaded with forage.

According to embodiments, the method may comprise:
activating 132 the first notification device in a second notification mode if the second forage dispensing arrangement is in a process of being loaded and the first forage dispensing arrangement is set to be loaded after the second forage dispensing arrangement, and
activating 134 the second notification device in the second notification mode if the first forage dispensing arrangement is in a process of being loaded and the second forage dispensing arrangement is set to be loaded after the first forage dispensing arrangement.

This invention should not be construed as limited to the embodiments set forth herein. A person skilled in the art will realize that different features of the embodiments disclosed herein may be combined to create embodiments other than those described herein, without departing from the scope of the present invention, as defined by the appended claims.

Although the invention has been described with reference to example embodiments, many different alterations, modifications and the like will become apparent for those skilled in the art. Mentioned purely as an example, an animal forage dispensing arrangement may have a capacity of 9-42 m3 and a length of the conveyor may be 5-15 m.

Although the invention has been described with reference to example embodiments, many different alterations, modifications and the like will become apparent for those skilled in the art. Therefore, it is to be understood that the foregoing is illustrative of various example embodiments and that the invention is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A method of controlling an animal forage handling arrangement (2), the method comprising the steps of:
starting a first conveyor (20) of the animal forage handling arrangement (2), wherein the animal forage handling arrangement (2) comprises a first forage dispensing arrangement (4) comprising a first container (18), the first conveyor (20), and a first separator (22) adapted to separate and distribute forage, wherein the first container (18) comprises two opposed lateral side surfaces (24), and a first dispensing end portion (26) and a first loading end portion (28) arranged between the two opposed lateral side surfaces (24), wherein the first separator (22) is arranged at the first dispensing end portion (26) of the first container (18), and wherein the first conveyor (20) is arranged at a bottom of the first container (18), the animal forage handling arrangement (2) further comprising a control unit (16), the control unit (16) connected to and operative to control a driving of the first conveyor (20) and comprises a first forage presence sensor (30) arranged at the first loading end portion (28), wherein the control unit (16) drives the first conveyor in an advancing direction where an upper side of the first conveyor is moved towards the first dispensing end portion (26) and in a reverse direction wherein the upper side of the first conveyor is moved towards the first loading end portion (28), wherein the starting (100) the first conveyor (20) moves the upper side of the first conveyor (20) in the reverse direction towards the first loading end portion (28), and
automatically stopping (102) the first conveyor (20) when a loading condition is fulfilled, to prepare the first conveyor (20) to be loaded with forage, wherein the loading condition is a first loading condition, which first loading condition is fulfilled when the first forage presence sensor (30) detects a presence of forage.

2. The method according to claim 1, wherein when first loading condition is fulfilled when the first forage presence sensor (30) detects the presence of forage, a new portion of forage is loaded on the first conveyor (20) abutting the detected forage.

3. The method according to claim 1, further comprising:
loading (106) a portion of forage onto the first conveyor (20) at the first loading end portion (28),
with the portion of forage loaded onto the first conveyor, starting (108) the first conveyor (20) to move the upper side of the first conveyor (20) in the forward direction towards the first dispensing end portion (26), and
automatically stopping (110) the first conveyor (20) when an advancing condition is fulfilled.

4. The method according to claim 3, wherein the advancing condition is a first advancing condition, which first advancing condition is fulfilled when the first forage presence sensor (30) detects an absence of forage.

5. The method according to claim 3, wherein the control unit (16) comprises a timer (34) and the advancing condition is a second advancing condition, which second advancing condition is fulfilled when the timer (34) reaches an end of a second time period, and wherein the method comprises:
starting (112) the timer (34) to count the second time period when starting the first conveyor (20) to move the upper side of the first conveyor (20) towards the first dispensing end portion (26).

6. The method according to claim 3, wherein the control unit (16) comprises a second forage presence sensor (32) arranged at the first dispensing end portion (26).

7. The method according to claim 6, wherein the control unit (16) is connected to a first notification device (36), and wherein the method comprises:
activating (118) the first notification device (36) when the second forage presence sensor (32) detects an absence of forage.

8. The method according to claim 3, wherein the advancing condition is a third advancing condition, which third advancing condition is fulfilled when the second forage presence sensor (32) detects a presence of forage.

9. The method according to claim 1, wherein the animal forage handling arrangement (2) comprises a second forage dispensing arrangement (6) comprising a second container, a second conveyor, and a second separator adapted to separate and distribute forage, wherein the second container comprises two opposed lateral side surfaces, and a second dispensing end portion and a second loading end portion arranged between the two opposed lateral side surfaces, wherein the second separator is arranged at the second dispensing end portion of the second container, and wherein the second conveyor is arranged at a bottom of the second container, wherein the control unit (16) is adapted to control a driving of the second conveyor and comprises a third forage presence sensor arranged at the second loading end portion, wherein the method comprises:
- starting (120) the second conveyor to move an upper side of the second conveyor towards the second loading end portion if the first conveyor (20) is standing still.

10. The method according to claim 9, comprising:
- stopping (122) the second conveyor when the first conveyor (20) is started.

11. The method according to claim 10, comprising:
- prioritising (124) a movement of the first conveyor (20) over a movement of the second conveyor if the first forage dispensing arrangement (4) is in a process of being loaded with forage, and
- prioritising (126) a movement of the second conveyor over a movement of the first conveyor (20) if the second forage dispensing arrangement (6) is in a process of being loaded with forage.

12. The method according to claim 9, comprising:
- prioritising (124) a movement of the first conveyor (20) over a movement of the second conveyor if the first forage dispensing arrangement (4) is in a process of being loaded with forage, and
- prioritising (126) a movement of the second conveyor over a movement of the first conveyor (20) if the second forage dispensing arrangement (6) is in a process of being loaded with forage.

13. The method according to claim 12, wherein the first notification device (36) is related to the first forage dispensing arrangement (4) and the control unit (16) is connected to a second notification device (38) related to the second forage dispensing arrangement (6), and wherein the method comprises:
- activating (128) the first notification device (36) in a first notification mode if the first forage dispensing arrangement (4) is in a process of being loaded with forage, and
- activating (130) the second notification device (38) in the first notification mode if the second forage dispensing arrangement (6) is in a process of being loaded with forage.

14. The method according to claim 13, comprising:
- activating (132) the first notification device (36) in a second notification mode if the second forage dispensing arrangement (6) is in a process of being loaded and the first forage dispensing arrangement (4) is set to be loaded after the second forage dispensing arrangement (6), and
- activating (134) the second notification device (38) in the second notification mode if the first forage dispensing arrangement (4) is in a process of being loaded and the second forage dispensing arrangement (6) is set to be loaded after the first forage dispensing arrangement (4).

15. An animal forage handling arrangement (2) adapted to perform a method according to claim 1.

16. A method of controlling an animal forage handling arrangement (2), the method comprising the steps of:
- starting a first conveyor (20) of the animal forage handling arrangement (2), wherein the animal forage handling arrangement (2) comprises a first forage dispensing arrangement (4) comprising a first container (18), the first conveyor (20), and a first separator (22) adapted to separate and distribute forage, wherein the first container (18) comprises two opposed lateral side surfaces (24), and a first dispensing end portion (26) and a first loading end portion (28) arranged between the two opposed lateral side surfaces (24), wherein the first separator (22) is arranged at the first dispensing end portion (26) of the first container (18), and wherein the first conveyor (20) is arranged at a bottom of the first container (18), the animal forage handling arrangement (2) further comprising a control unit (16), the control unit (16) connected to and operative to control a driving of the first conveyor (20) and comprises a first forage presence sensor (30) arranged at the first loading end portion (28), wherein the starting (100) the first conveyor (20) moves an upper side of the first conveyor (20) towards the first loading end portion (28), and
- automatically stopping (102) the first conveyor (20) when a loading condition is fulfilled, to prepare the first conveyor (20) to be loaded with forage,
- wherein the control unit (16) comprises a timer (34) and the loading condition is a second loading condition, which second loading condition is fulfilled when the timer (34) reaches an end of a first time period, and wherein the method comprises:
- starting (104) the timer (34) to count the first time period when starting the first conveyor (20) to move the upper side of the first conveyor (20) towards the first loading end portion (28).

17. A method of controlling an animal forage handling arrangement (2), the method comprising the steps of:
- starting a first conveyor (20) of the animal forage handling arrangement (2), wherein the animal forage handling arrangement (2) comprises a first forage dispensing arrangement (4) comprising a first container (18), the first conveyor (20), and a first separator (22) adapted to separate and distribute forage, wherein the first container (18) comprises two opposed lateral side surfaces (24), and a first dispensing end portion (26) and a first loading end portion (28) arranged between the two opposed lateral side surfaces (24), wherein the first separator (22) is arranged at the first dispensing end portion (26) of the first container (18), and wherein the first conveyor (20) is arranged at a bottom of the first container (18), the animal forage handling arrangement (2) further comprising a control unit (16), the control unit (16) connected to and operative to control a driving of the first conveyor (20) and comprises a first forage presence sensor (30) arranged at the first loading end portion (28), wherein the starting (100) the first conveyor (20) moves an upper side of the first conveyor (20) towards the first loading end portion (28), and
- automatically stopping (102) the first conveyor (20) when a loading condition is fulfilled, to prepare the first conveyor (20) to be loaded with forage,
- wherein the control unit (16) is connected to a first notification device (36), and wherein the method comprises:
- keeping (114) track of a progress of the movement of the upper side of the first conveyor (20) towards the first dispensing end portion (26), and
- indicating (116) by means of the first notification device (36) a progress of a portion of the first conveyor (20) along a distance between the first loading end portion (28) and the first dispensing end portion (26).

18. The method according to claim 17, wherein the first notification device (36) is related to the first forage dispensing arrangement (4) and the control unit (16) is connected to a second notification device (38) related to the second forage dispensing arrangement (6), and wherein the method comprises:
- activating (128) the first notification device (36) in a first notification mode if the first forage dispensing arrangement (4) is in a process of being loaded with forage, and
- activating (130) the second notification device (38) in the first notification mode if the second forage dispensing arrangement (6) is in a process of being loaded with forage.

19. The method according to claim 18, comprising:
- activating (132) the first notification device (36) in a second notification mode if the second forage dispensing arrangement (6) is in a process of being loaded and the first forage dispensing arrangement (4) is set to be loaded after the second forage dispensing arrangement (6), and
- activating (134) the second notification device (38) in the second notification mode if the first forage dispensing arrangement (4) is in a process of being loaded and the second forage dispensing arrangement (6) is set to be loaded after the first forage dispensing arrangement (4).

\* \* \* \* \*